May 18, 1954   C. C. McCAIN   2,678,467
APPARATUS FOR FORMING FLANGED ARTICLES
Filed Feb. 14, 1951   5 Sheets-Sheet 1
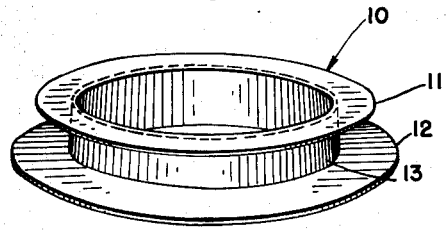
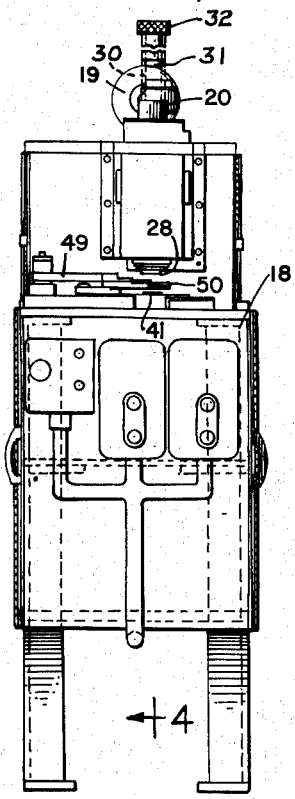
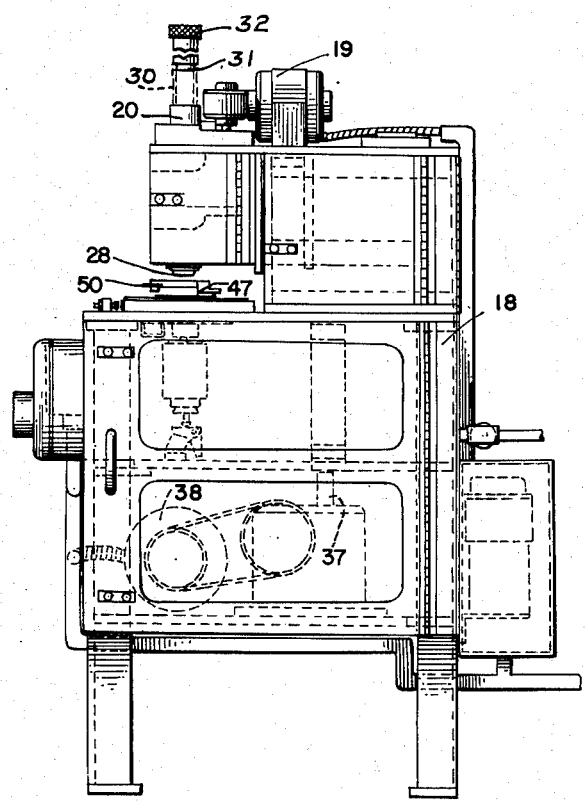
INVENTOR:
C. C. McCAIN
BY
*E. F. Kane*
ATTORNEY May 18, 1954

C. C. McCAIN 2,678,467

APPARATUS FOR FORMING FLANGED ARTICLES

Filed Feb. 14, 1951

INVENTOR:
C. C. McCAIN
BY
ATTORNEY

May 18, 1954  C. C. McCAIN  2,678,467
APPARATUS FOR FORMING FLANGED ARTICLES
Filed Feb. 14, 1951  5 Sheets-Sheet 4

INVENTOR:
C. C. McCAIN
BY
*E. H. Kane*
ATTORNEY

May 18, 1954

C. C. McCAIN 2,678,467

APPARATUS FOR FORMING FLANGED ARTICLES

Filed Feb. 14, 1951

INVENTOR:
C. C. McCAIN

BY

*E. F. Kane*

ATTORNEY

Patented May 18, 1954

2,678,467

UNITED STATES PATENT OFFICE 2,678,467

APPARATUS FOR FORMING FLANGED ARTICLES

Cecil C. McCain, Glen Ellyn, Ill., assignor to Western Electric Company, Incorporated, New York, N. Y., a corporation of New York Application February 14, 1951, Serial No. 210,842

4 Claims. (Cl. 18—19)

This invention relates to apparatus for forming flanged articles, and more particularly to apparatus for forming flanged spools from tubular lengths of thermoplastic material with heated rolling elements.

An object of the invention is to provide new and improved apparatus for forming flanged articles.

A further object of the invention is to provide apparatus for forming spools from short lengths of thermoplastic material with heated rolling elements.

Another object of the invention is to provide apparatus for automatically feeding an elongated tube of thermoplastic material to heated flanged rolling elements, cutting short lengths off the tube, rolling the short lengths with the heated forming elements to the shape of the spool and ejecting the spool.

In accordance with an apparatus illustrating certain features of the invention, an elongated tube of thermoplastic material is positioned over a forming element having an annular groove therein. The tube is severed to separate the portion on the forming element from the remainder thereof. The exterior clamping elements then are clamped around the short length of thermoplastic material, and the outer and inner clamping elements are shifted axially relative to one another and turned relative to one another to form the plastic material into the annular groove to form it into a flanged spool.

A complete understanding of the invention may be obtained from the following detailed description of an apparatus forming a specific embodiment thereof, when read in conjunction with the appended drawings, in which Fig. 1 is a perspective view of a spool made by an apparatus forming a specific embodiment of the invention;

Fig. 2 is a front elevation of an apparatus forming a specific embodiment of the invention;

Fig. 3 is a side elevation of the apparatus shown in Fig. 2;

Figure 4:
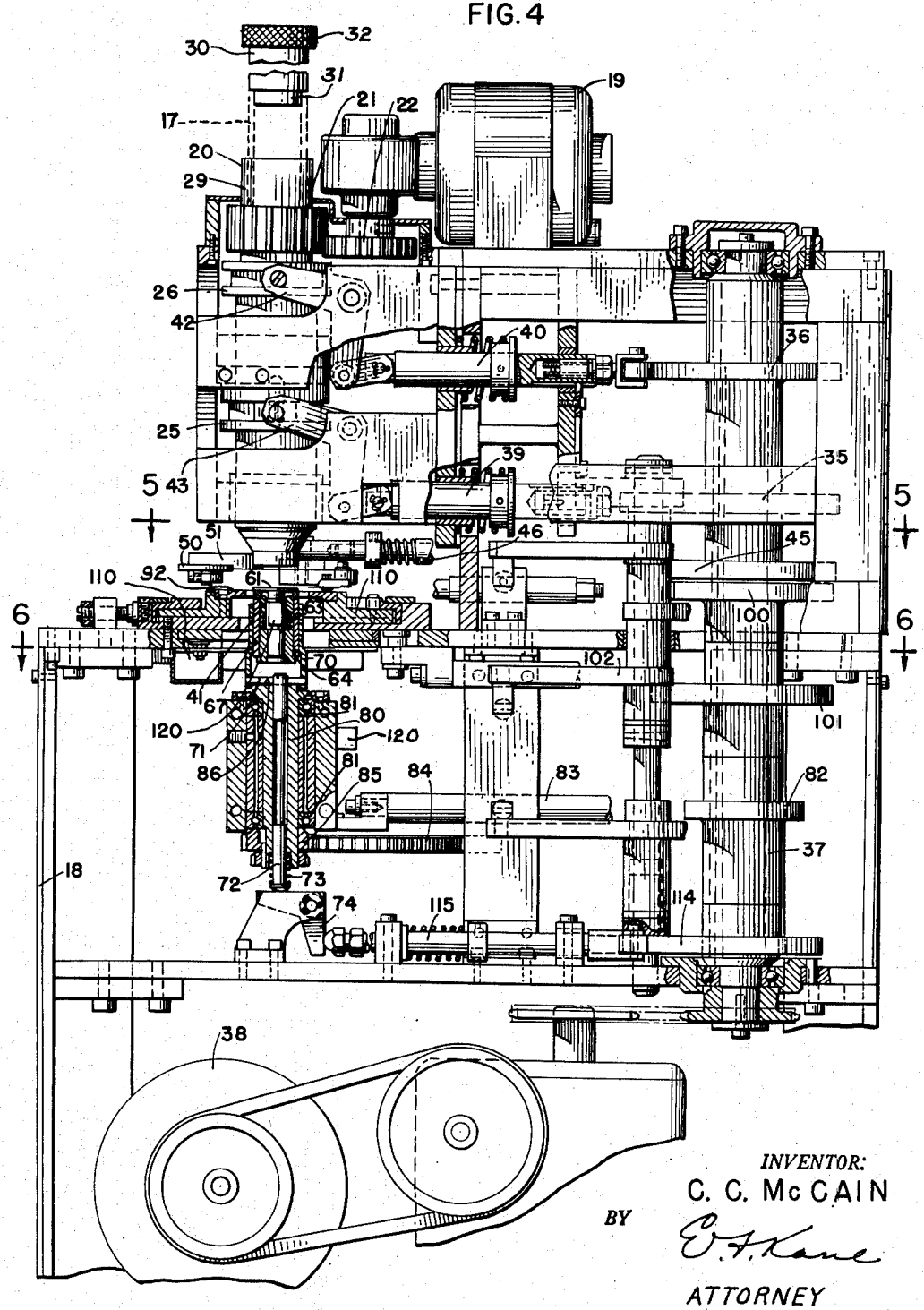
Fig. 4 is an enlarged, vertical section taken along line 4—4 of Fig. 2.
Figure 7:
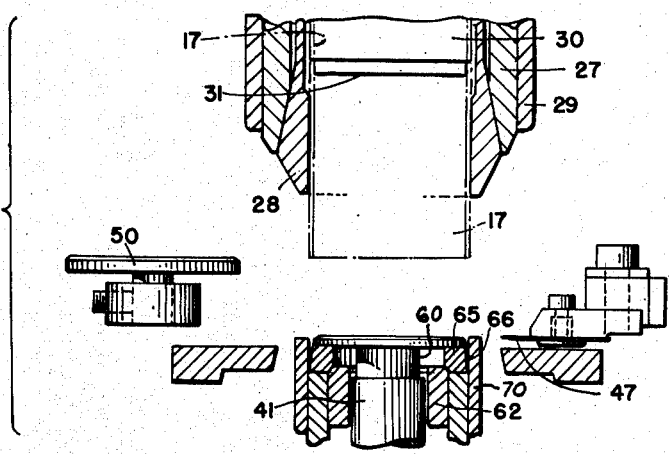
Fig. 7 is an enlarged, fragmentary, vertical section of a portion of the apparatus shown in Fig. 2.

Referring now in detail to the drawings, there is shown therein an apparatus for forming a spool 10 having flanges 11 and 12 and a tapered drum 13 from a short length cut from a tube 17 composed of a thermoplastic material, such as cellulose butyrate, copolymerized vinyl chloride and vinyl acetate, polyethylene, or the like. This apparatus includes a housing 18 supporting an electric motor drive 19, which rotates a collet feed 20 by means of a gear 21 (Fig. 4), which meshes with and is slidable with respect to a gear 22. When a collar 25 is moved upwardly with respect to a collar 26, which supports a wedge 27 (Fig. 7) mounted slidably between a collet 28 pinned rigidly to the collar 25 and a guide sleeve 29, the wedge closes the collet 28 on the tube 17 to prevent movement of the tube by a tubular weighted guide 30 having a shank portion 31 (Fig. 7) and a stop collar 32 (Fig. 4). That is, whenever there is such relative movement between the collet 28 and the wedge 27 that the wedge is down farther on the collet the collet is closed, and the collet is opened on the reverse of such movement. The pin extends transversely of the collet and the collar 25, secures them rigidly together, and projects through longitudinal slots in the wedges and the guide sleeve 29. The guide is slightly shorter than the collet, and is slidable in the upper portion of the collet.

Figure 9:
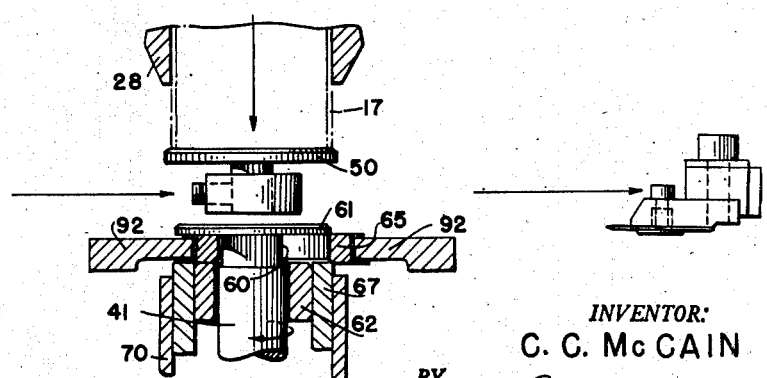
Fig. 9 is an enlarged, fragmentary, vertical section similar to those shown in Figs. 7 and 8 with the elements shown in different positions.

Cams 35 and 36 (Fig. 4) fixed to a cam shaft 37 driven by an electric motor 38 are designed to move the collars 25 and 26 together downwardly a predetermined distance through spring-pressed followers 39 and 40, respectively, and forks 43 and 42, respectively, to feed the lower end of the tube 17 over the upper end of a forming spindle 41. The cams hold the collars in these positions while a cam 45 swings against the tube 17, through an adjustable follower 46, a cutting blade 47 secured removably to an arm 48 of a yoke 49. The tube 17 is rotated by the collet feed, and the bottom portion is severed by the cutting blade. The cam 36 then retracts the collet feed 20 to the position thereof shown in Fig. 4, and the cam 35 lifts the collar 25 therewith. As the newly created lower end of the tube 17 is lifted above a stop 50 mounted on an arm 51 of the yoke 49, the cam 45 and the follower 46 move the stop 50 under the tube 17. The cam 35 then swings the yoke 41 in a clockwise direction, as viewed in Fig. 4, to lift the wedge 27 to release the collet 28, and the tube 17 drops to the stop 50 (Fig. 9). The cam 35 then swings the yoke 41 in a counterclockwise direction, as viewed in view in Fig. 4, to actuate the collet 28 to reclamp the tube.

The spindle 41 is provided with an annular groove 60 and a cap 61 forming one edge of the groove. A beveled centering sleeve 62 urged upwardly by a compression spring 63 held on the spindle 41 by a collar 64 centers a ring 65 having a frusto-conical surface 66 with respect to the spindle 41 mounted slidably between a sleeve 67 fastened rigidly to the spindle 41 and the cap 61. A stripping sleeve 70 is mounted slidably on the sleeve 67 and is supported in a bore through a pin 71 slidably mounted on a push rod 72 urged downwardly by a spring 73 against a bell crank lever 74. The pin 71 is movable lengthwise through the bore in the push rod 72 but is fixed against movement along the push rod. The pin 71 is fixed rigidly to the stripping sleeve so that longitudinal movement of the push rod moves the pin 71, which moves the stripping sleeve in the same direction as the push rod. The sleeve 67 is secured integrally to a hollow shaft 80 mounted rotatably on bearings 81—81, and is offset from the axis of the hollow shaft. A cam 82 fixed to the cam shaft 37 is designed to actuate a cam follower 83 to swing a gear segment 84 to rotate the shaft 80 through a gear 85 fixed thereto. When the hollow shaft 80 is rotated, it revolves the spindle 41 and the sleeves 67 and 70 about the axis of the hollow shaft, the pin 71 being mounted in a slot 86 formed in the shaft 80.

A supporting plate 90 mounted pivotally on a post 91 (Fig. 5), supports arcuate jaws 92—92 slidably thereon. The jaws 92—92 may be slid radially inwardly with respect to the center of arcuate gripping surfaces 93—93 formed thereon, by means of a camming ring 94 provided with cam slots 95—95 to force pins 96—96 secured to jaws 92—92 radially inwardly. The ring 94 may be turned by a spring-pressed cam follower 97 to move the pins 96—96 radially inwardly. The follower 97 is operable by a cam 100 fixed to the cam shaft 37 to turn the ring 94 in a counterclockwise direction, as viewed in Fig. 5. The plate 90 may be swung in a counter-clockwise direction, as viewed in Fig. 6, around the post 91 by means of a cam 101 and a cam follower 102 against the action of tension spring 103 to shift the jaws 92—92 from their position shown in Fig. 5, in which the jaws 92—92 are centered on the cap 61 and the spindle 41, to the positions thereof in which the jaws are centered with respect to the axis of the hollow shaft 80 and the cam 100 keeps the jaws 92—92 closed on the tube at this time. It is at this time that the cam 82 becomes operative to swing the gear segment 84 to rotate the hollow shaft 80 which rotation revolves the spindle 41 about the axis of the shaft 80, and the jaws 92—92 enter between the tube 67 and the disc 61 to form flanges on the tubing.

Electrical heating element 110 mounted on the jaws 92—92 keep the jaws 92—92 sufficiently hot that the thermoplastic material is softened sufficiently to be deformable and set into as flanges, and to form the central portion of the tube which is held between the jaws 92—92 and the ring 65 into frusto-conical shape. The arcuate clamping surfaces 93—93 serve to form a frustrum which is parallel to the frusto-conical surface 66 of the ring 65. The cam 101 then actuates the cam follower 102 to swing the plate 90 back to a position in which the jaws 92—92 are centered on the spindle 41 which has been indexed at this time by return movement of the gear segment 80, and the cam 100 actuates the cam follower 97 to rotate the camming ring 94 in a clockwise direction to move the jaws 92—92 away from the spindle 41. The beveled sleeve 62 then holds the ring 65 in a centered position relative to the spindle 41, and a cam 114 urges the cam follower 115 to the left, as viewed in Fig. 4, to force the stripping sleeve 70 upwardly to move the spool 10 completely off the spindle 41, and also actuates an air valve to supply a blast of air through a nozzle 116 (Fig. 6) to blow the spool out of the apparatus. An electrical heating unit 120 maintains the spindle 41 at a temperature just sufficient to soften the thermoplastic material and permit it to be formed without making the material tacky. A satisfactory temperature for cellulose butyrate has been found to be in the order of 200° F. while the melting point of the material formed was roughly 300° F.

*Operation*

Figure 5:
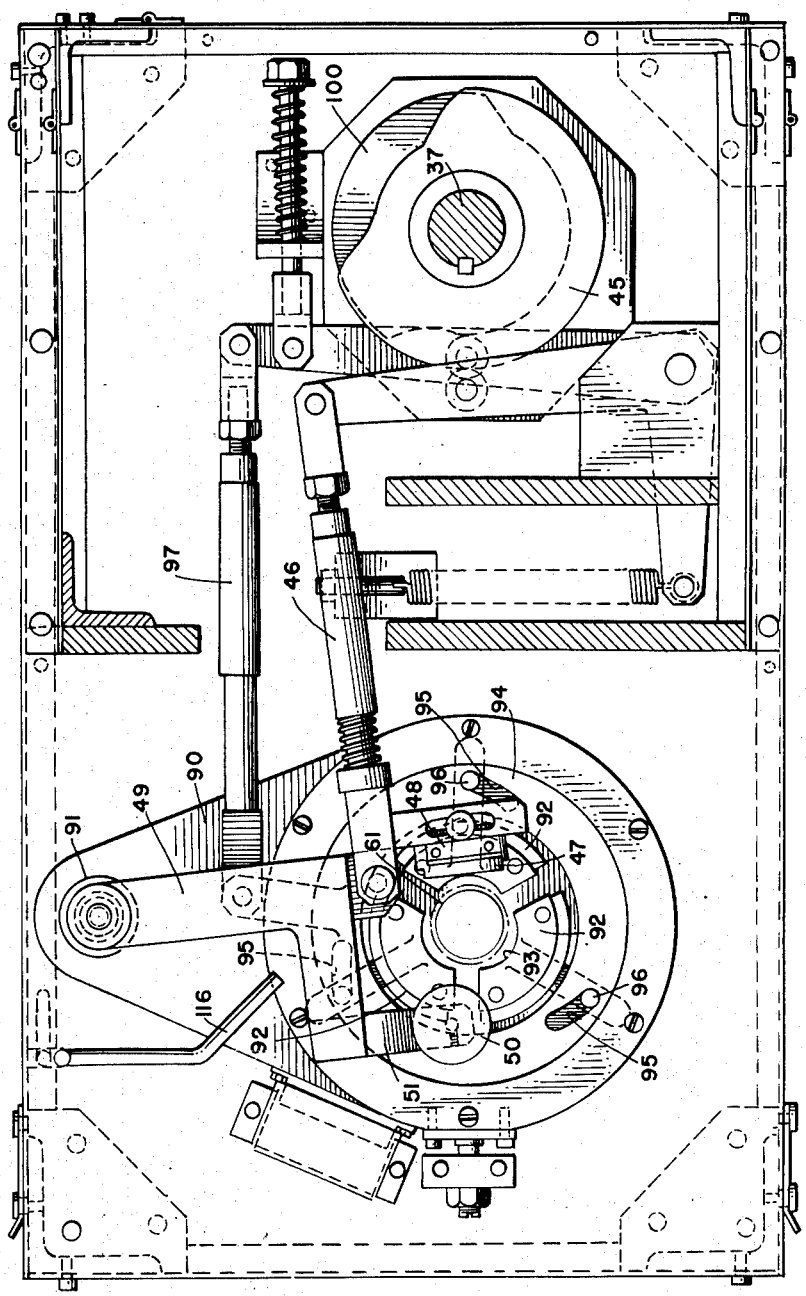
Fig. 5 is a horizontal section taken along line 5—5 of Fig. 4.

The collet feed 20 gripping the tube 17 is moved downwardly to move the lower end of the tube 17 over the spindle 41, and the cam 45 swings the yoke 49 in a clockwise direction, as viewed in Fig. 5, about the post 91 to move the blade 47 to cutting engagement with the tube 17, which is being rotated by the collet feed 20. The blade 47 severs the tube completely and the collet feed is retracted. The cam 45 and follower 46 then actuate the yoke 49 to move the blade 47 and the stop 50 in counter-clockwise directions, as viewed in Fig. 5, until the stop 50 is under the tube 17. Meanwhile, the cam 100 actuates the ring 94 to move the heated jaws 92—92 into gripping engagement with the central portion of the length of the tube of the thermoplastic material left on the spindle 41, and grips this portion against the ring 65 to form the gripped portion of the tubing into a frustrum.

Figure 6:
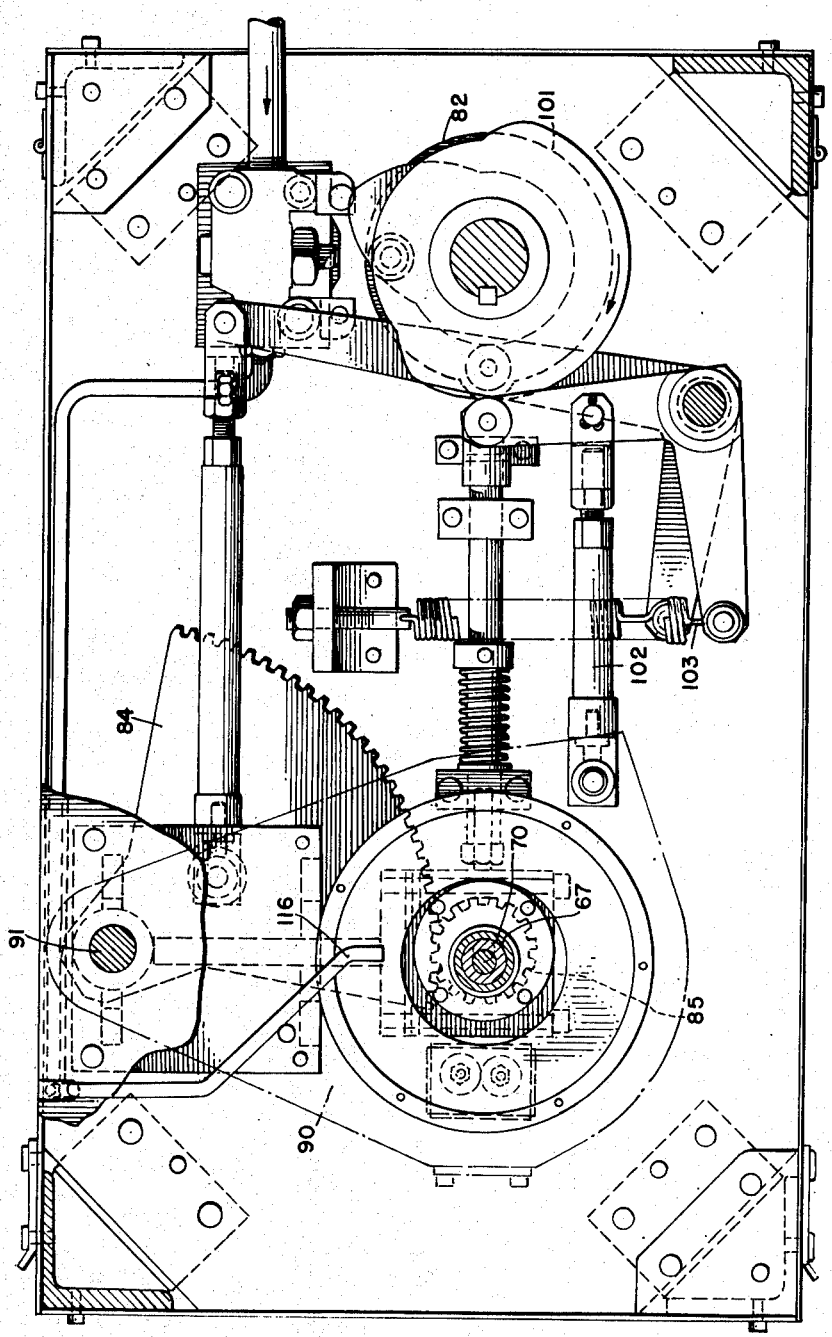
Fig. 6 is an enlarged, horizontal section taken along line 6—6 of Fig. 4.
Figure 8:
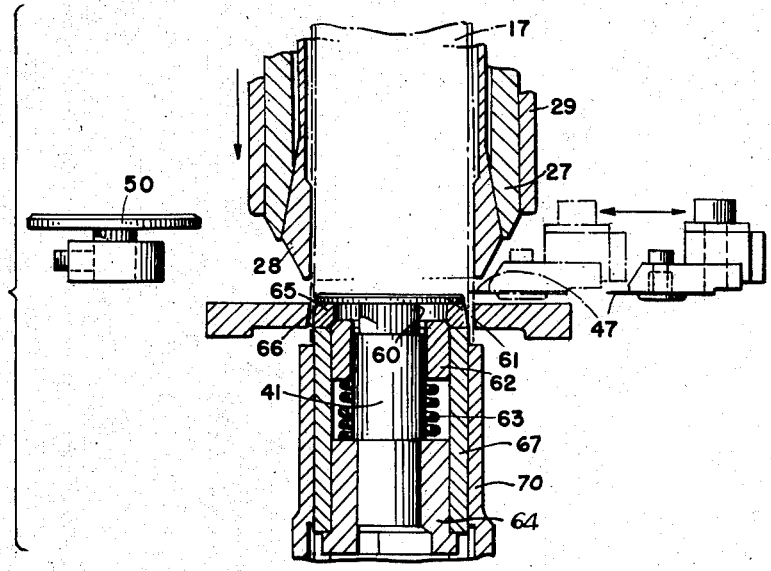
Fig. 8 is an enlarged, vertical section similar to that shown in Fig. 7 with the elements in different positions.

The cam 101 then actuates the cam follower 102 to swing the supporting plate 90 in a counterclockwise direction, as viewed in Fig. 6, and this swings the jaws 92—92 and the ring 65 from the positions in which they are shown in Fig. 8, in which they are centered on the spindle 41, to the positions in which they are shown in Fig. 9 in which they are centered on the hollow shaft 80 and are off-center with respect to the spindle 41. The cam 82 then actuates the gear segment 84 to rotate the hollow shaft 80 for a predetermined number of revolutions, for example, three revolutions. The jaws 92—92 incrementally enter the cap 61 and the sleeve 67 to draw the tubing into the flanges. The gear segment 84 then is spring-returned to return the spindle to its previously indexed starting position. The follower 102 then is permitted by the cam 101 to return the jaws 92—92 to positions centered on the spindle 41, and the cam 45 permits the follower 46 to move the ring 94 to its releasing position in which the jaws 92—92 have been retracted from the flanged spool. The cam 114 then actuates the cam follower 115 to raise the sleeve through the bell crank lever 74 and the rod 72 to lift the formed spool off the spindle 41, and also actuates the air valve to send a blast of air through the nozzle 116 to remove the formed spool to a suitable receptacle (not shown).

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming flanged articles, which comprises a cylindrical element having an annular groove therein, a forming element having a shoulder thereon, means for locating a sheet-like, flexible tube composed of thermoplastic material around the groove, a collar having the same external diameter as the groove and a thickness substantially less than the depth of the groove fitting slidably into the groove, an external former for pressing a portion of the flexible tube into the groove to form flanges on the tube, and means for creating relative revolving movement between the tube and the cylindrical element on the one hand and the former on the other hand.

2. An apparatus for forming flanged articles, which comprises a spindle having a groove therein, means for feeding a tube onto the spindle, means for cutting off a length of the tube positioned on the spindle, segmental jaws for gripping the cut-off portion of the tube extending along the groove, means for shifting one of the jaws and the spindle off-center with respect to the other, means for revolving one of the spindles and the jaws with respect to the other to roll the cut-off portion of the tube into the groove, a backing ring mounted slidably in the groove in the spindle, means urging the ring toward a portion centered with respect to the spindle, and a sleeve mounted slidably on the spindle for stripping the cut-off portion of the tube from the spindle.

3. An apparatus for forming flanged spools, which comprises a spindle having an annular groove therein, a backing ring mounted slidably and rotatably in the groove, arcuate jaws for clamping a tube against the backing ring and for entering the groove in the spindle, a stripping sleeve mounted slidably on the spindle, means for closing the jaws, means for shifting the jaws to positions centered on an axis off-center from the spindle, means for revolving the spindle about said axis, means for heating the jaws, means for heating the spindle, a collet for gripping a tube, means for moving the collet toward the spindle to feed the end of the tube over the spindle, means for severing the tube between the collet and the spindle, means for retracting the collet after the tube has been cut, means for feeding the tube along the collet after it has been retracted, and means for gaging the feed of the tube.

4. An apparatus for forming flanged articles, which comprises a spindle having a groove therein, presser means cooperative with the spindle for rolling a short length of tubing into a spool, collet means spaced from one end of the spindle, means for moving the collet means toward the spindle to feed the end portion of a long length of tubing held by the collet means over the spindle, a yoke bracketing the long length of portion of the tubing between the spindle and the collet means, a cutter mounted on one arm of the yoke, a stop mounted on the other arm of the yoke, means for actuating the yoke to move the long length of cutter into engagement with the tubing to sever the length of tubing to form two lengths thereof, means for moving the collet away from the spindle to separate the lengths thereof formed by the cutter, means for actuating the yoke to move the stop between said lengths of tubing, and means for feeding the portion of the length of tubing in the collet along the collet to the stop.

References Cited in the file of this patent

UNITED STATES PATENTS

| Number | Name | Date |
|---|---|---|
| 835,131 | Baker | Apr. 21, 1908 |
| 986,995 | Keyes | Mar. 14, 1911 |
| 1,740,792 | Strachauer et al. | Dec. 24, 1929 |
| 1,776,888 | Clark | Sept. 30, 1930 |
| 2,034,731 | Saalbach | Mar. 24, 1936 |
| 2,215,845 | Williams | Sept. 24, 1940 |
| 2,442,965 | Thomas | June 8, 1948 |